United States Patent
Shigemitsu

(10) Patent No.: US 10,838,679 B2
(45) Date of Patent: Nov. 17, 2020

(54) COMMUNICATION SYSTEM, TERMINAL DEVICE, AND METHOD FOR CONTROLLING COMMUNICATION SYSTEM

(71) Applicant: SEIKO EPSON CORPORATION, Tokyo (JP)

(72) Inventor: Makoto Shigemitsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 65 days.

(21) Appl. No.: 16/113,252

(22) Filed: Aug. 27, 2018

(65) Prior Publication Data
US 2019/0065131 A1 Feb. 28, 2019

(30) Foreign Application Priority Data
Aug. 28, 2017 (JP) ................................ 2017-163068

(51) Int. Cl.
| | |
|---|---|
| *G06F 3/14* | (2006.01) |
| *G06F 1/3209* | (2019.01) |
| *G06F 1/3206* | (2019.01) |
| *G06F 1/3287* | (2019.01) |

(Continued)

(52) U.S. Cl.
CPC .......... *G06F 3/1423* (2013.01); *G06F 1/3206* (2013.01); *G06F 1/3209* (2013.01); *G06F 1/3287* (2013.01); *G06F 1/3296* (2013.01); *H04L 67/141* (2013.01); *G09G 2370/16* (2013.01); *H04L 67/125* (2013.01)

(58) Field of Classification Search
CPC .... G06F 3/1423; G06F 1/3287; G06F 1/3206; G06F 1/3209; G06F 1/3296; H04L 67/141; H04L 67/125; G09G 2370/16
USPC ............................................................. 345/2
See application file for complete search history.

(56) References Cited

U.S. PATENT DOCUMENTS

| | | | |
|---|---|---|---|
| 2004/0126749 | A1 | 7/2004 | Honma et al. |
| 2005/0216549 | A1* | 9/2005 | Amano ............... G06Q 10/109 709/202 |

(Continued)

FOREIGN PATENT DOCUMENTS

| | | |
|---|---|---|
| JP | 2003-36218 A | 2/2003 |
| JP | 2004-126401 A | 4/2004 |

(Continued)

*Primary Examiner* — Chineyere D Willis-Burns
(74) *Attorney, Agent, or Firm* — Oliff PLC

(57) ABSTRACT

In a display system, one tablet terminal transmits control information to another tablet terminal. If the another tablet terminal receives the control information from the one tablet terminal, the another tablet terminal starts executing an application and starts communicating with a projector. The one tablet terminal transmits, to the projector, display instruction information instructing the another tablet terminal to display information. The projector receives the display instruction information from the one tablet terminal and transmits the display instruction information to the another tablet terminal currently connected to the projector. The another tablet terminal displays, on a touch panel, information designated by the display instruction information, if the another tablet terminal receives the display instruction information from the projector while executing the application.

9 Claims, 9 Drawing Sheets

(51) Int. Cl.
*G06F 1/3296* (2019.01)
*H04L 29/08* (2006.01)

(56) References Cited

U.S. PATENT DOCUMENTS

| | | | | |
|---|---|---|---|---|
| 2009/0043899 | A1* | 2/2009 | Kubota | H04L 12/1818 |
| | | | | 709/228 |
| 2010/0064260 | A1* | 3/2010 | Amano | G06F 3/1438 |
| | | | | 715/859 |
| 2010/0328331 | A1* | 12/2010 | Iwaki | G09G 5/393 |
| | | | | 345/547 |
| 2011/0083080 | A1 | 4/2011 | Kubota | |
| 2012/0250610 | A1* | 10/2012 | Budampati | H04L 67/125 |
| | | | | 370/328 |
| 2014/0033058 | A1* | 1/2014 | Perotti | G08C 17/00 |
| | | | | 715/740 |
| 2015/0002435 | A1* | 1/2015 | Shimizu | G09G 5/12 |
| | | | | 345/173 |
| 2015/0199166 | A1* | 7/2015 | Eguchi | G06F 3/1454 |
| | | | | 345/2.2 |
| 2016/0054972 | A1* | 2/2016 | Igawa | G06F 3/147 |
| | | | | 345/2.2 |
| 2016/0286077 | A1* | 9/2016 | Hanano | H04N 1/00896 |

FOREIGN PATENT DOCUMENTS

| | | |
|---|---|---|
| JP | 2006-313275 A | 11/2006 |
| JP | 2009-42914 A | 2/2009 |

\* cited by examiner

COMMUNICATION SYSTEM, TERMINAL DEVICE, AND METHOD FOR CONTROLLING COMMUNICATION SYSTEM

CROSS-REFERENCE

The entire disclosure of Japanese Patent Application No. 2017-163068, filed Aug. 28, 2017 is expressly incorporated by reference herein.

BACKGROUND

1. Technical Field

The present invention relates to a communication system, a terminal device, and a method for controlling a communication system.

2. Related Art

According to the related art, a system which allows a plurality of terminals to operate is known (see, for example, JT-A-2003-36218). The system disclosed in JP-A-2003-36718 includes a teacher terminal used by a teacher and a plurality of student terminals used by students. A server multicasts and distributes teaching material information designated by the teacher terminal. The student terminals show a display based on the teaching material information.

In the related-art system, before starting operation, each terminal needs to be ready to communicate with the other terminals and the server. For example, JR-A-2003-36218 discloses that the system needs work such as turning on the power of the student terminals and thus starting up the student terminals before starting a lesson, setting a destination address for the student terminals, and having the students start the student terminals to get ready for the lesson. Such work puts a heavy burden on the user using a terminal or a technical expert carrying out work in place of the user.

SUMMARY

An advantage of some aspects of the invention is that, in a system which allows a plurality of devices including a terminal to operate, the work of getting the terminal ready to communicate with the other devices can be carried out more easily.

An aspect of the invention is directed to a communication system including: a display device; a first terminal which has a display unit displaying an image and a control unit executing an application and which communicates with an external device including the display device; and a second terminal which communicates with the first terminal and the display device. The second terminal transmits control information to the first terminal. If the first terminal receives the control information from the second terminal, the first terminal starts executing the application via the control unit, causes the control unit to connect to the display device by a function of the application, and starts communicating with the display device. The second terminal transmits, to the display device, display instruction information instructing the first terminal to display information. The display device receives the display instruction information from the second terminal and transmits the display instruction information to the first terminal currently connected to the display device. The first terminal causes the display unit to display information designated by the display instruction information, if the first terminal receives the display instruction information from the display device while executing the application.

This configuration enables the second terminal to cause the first terminal to start executing the application and thus enables the first terminal to connect to the display device, based on a function of this application. Thus, with the use of the second terminal, the first terminal can easily be enabled to communicate with the display device. Also, transmitting the display instruction information from the second terminal to the display device enables the first terminal to display information. After the first terminal is connected to the display device, transmitting information from the second terminal to the display device enables the first terminal to operate. This can be realized even if the processing capability of the second terminal is low. Thus, a system can be realized in which an operation of the second terminal by the user can cause an application installed in the first terminal to operate.

The aspect of the invention may be configured such that the first terminal is able to execute a normal operation state where the control unit can execute the application and a power-saving state where the execution of the application and the display by the display unit are stopped, and the first terminal shifts to the normal operation state and executes the application, if the first terminal receives the control information from the second terminal when in the power-saving state.

This configuration enables the second terminal to cause the first terminal to start executing the application from the power-saving state. Thus, the operation to return the first terminal from the power-saving state to the normal operation state can be omitted. Even if the first terminal is scheduled to be used, there is no need to return the first terminal to the normal operation state from the power-saving state in advance. Therefore, the first terminal can wait in the power-saving state, thus saving power.

The aspect of the invention may be configured such that, if the first terminal is connected to the display device by a function of the application, the display device generates connection information indicating the first terminal currently connected to the display device, and the display device transmits the display instruction information to the first terminal, based on the connection information, if the display device receives the display instruction information from the second terminal.

With this configuration, the display device generates connection information about the first terminal and transmits the display instruction information to the first terminal, based on the connection information, thus causing the first terminal to display information. Thus, the display device can efficiently manage the connection state with the first terminal.

The aspect of the invention may be configured such that the first terminal has an operation unit, and after starting executing the application, the first terminal shifts to an operation limiting mode where acceptance of an operation by the operation unit is limited, based on a function of the application.

This configuration can prevent an operation on the first terminal from disturbing the state of control by the second terminal and the display device.

The aspect of the invention may be configured such that the second terminal transmits information to be displayed by the first terminal and the display instruction information to the display device, and the first terminal causes the display unit to show a display based on the information, according to the display instruction information received from the display device.

This configuration enables the first terminal to execute the display, based on the information transmitted from the second terminal to the display device. Therefore, the load on the second terminal can be reduced when the information to be displayed by the first terminal needs to be distributed from the second terminal.

The aspect of the invention may be configured such that the second terminal transmits the display instruction information designating information to be displayed by the first terminal, to the display device, and the first terminal acquires the information designated by the display instruction information received from the display device and cause the display unit to show a display based on the acquired information.

With this configuration, the second terminal designates the information to be displayed by the first terminal and this causes the first terminal to show a display. Therefore, the load on the second terminal when causing the first terminal to display information can be reduced further.

The aspect of the invention may be configured such that the first terminal, after causing the control unit to start executing the application, transmits information representing content of display on the display unit to the display device, based on a function of the application.

This configuration enables the display device to process the content to be displayed by the first terminal.

Another aspect of the invention is directed to a terminal device including a communication unit capable of communicating with a display device and an external terminal device, a display unit, and a control unit executing an application. The terminal device can execute a normal operation state where the control unit can execute the application and a power-saving state where the execution of the application and a display by the display unit are stopped. If the communication unit receives control information transmitted from the external terminal device when the terminal device is in the power-saving state, the control unit shifts to the normal operation state. The control unit starts executing the application. The terminal device connects to the display device and starts communicating, based on a function of the application. If display instruction information s transmitted from the display device during the execution of the application, the terminal device causes the display unit to display information designated by the display instruction information.

This configuration enables the external terminal device to cause the terminal device to start executing the application and thus enables the terminal device to connect to the display device, based on a function of this application. Thus, with the use of the external terminal device, the terminal device can easily be enabled to communicate with the display device.

Still another aspect of the invention is directed to a method for controlling a communication system including: a display device; a first terminal which has a display unit displaying an image and a control unit executing an application and which communicates with an external device including the display device; and a second terminal which communicates with the first terminal and the display device. The method includes: causing the second terminal to transmit control information to the first terminal; causing the first terminal to receive the control information from the second terminal, start executing the application via the control unit, cause the control unit to connect to the display device by a function of the application, and start communicating with the display device; causing the second terminal to transmit, to the display device, display instruction information instructing the first terminal to display information; causing the display device to receive the display instruction information from the second terminal and transmit the display instruction information to the first terminal currently connected to the display device; and causing the first terminal to receive the display instruction information transmitted from the display device while the first terminal is executing the application, and display, via the display unit, information designated by the display instruction information received from the display device.

This configuration enables the second terminal to cause the first terminal to start executing the application and thus enables the first terminal to connect to the display device, based on a function of this application. Thus, with the use of the second terminal, the first terminal can easily be enabled to communicate with the display device. Also, transmitting the display instruction information from the second terminal to the display device enables the first terminal to display information. After the first terminal is connected to the display device, transmitting information from the second terminal to the display device enables the first terminal to operate. This can be realized even if the processing capability of the second terminal is low. Thus, a system can be realized in which an operation of the second terminal by the user can cause an application installed in the first terminal to operate.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
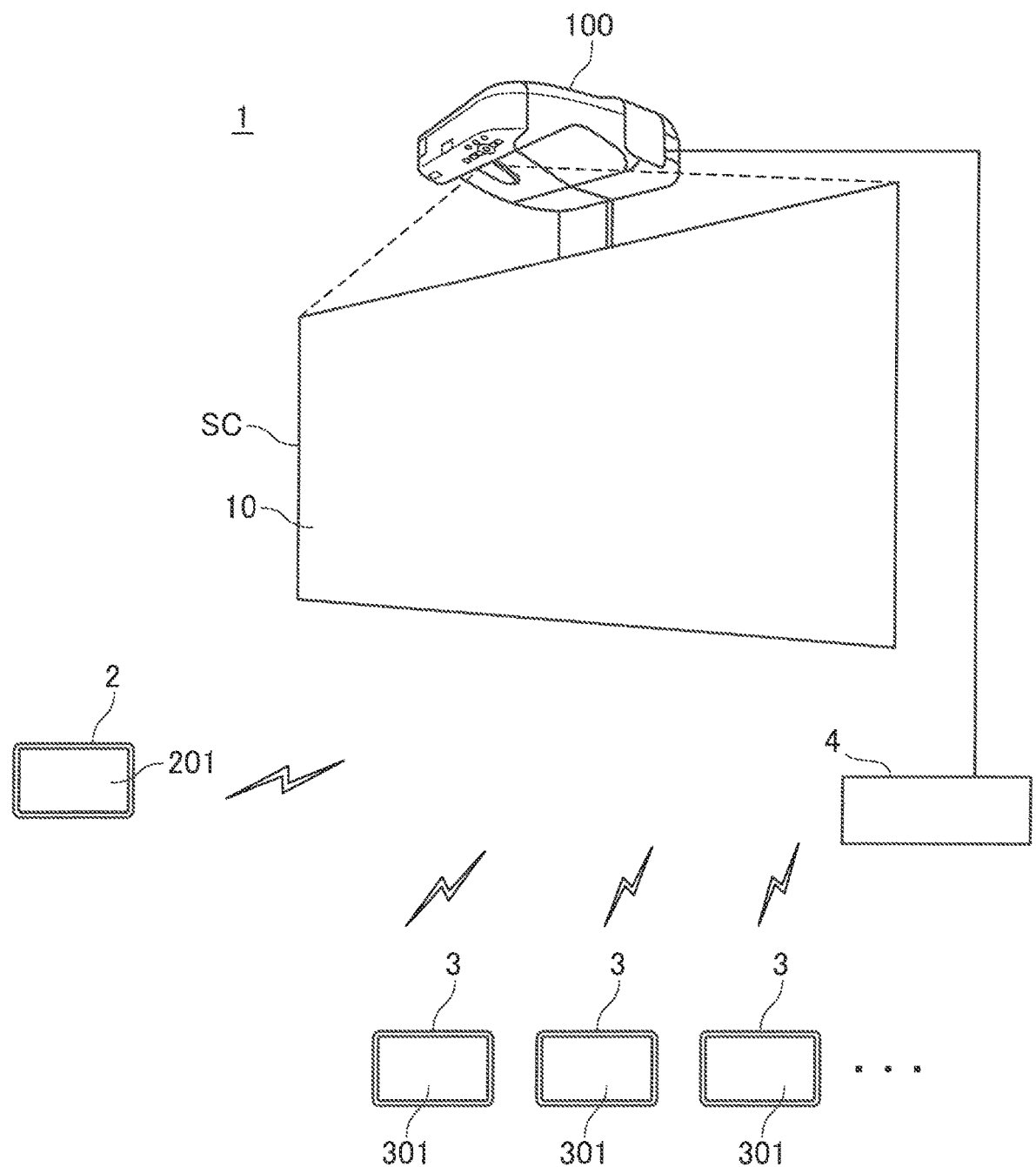
FIG. 1 shows a schematic configuration of a display system.

FIG. 1 shows a schematic configuration of a display system 1 (communication system).

The display system 1 has a projector 100 (display device) which projects an image on a screen SC. In the display system 1, a tablet terminal 2 and a tablet terminal 3 are connected to the projector 100 in such a way as to be able to communicate data. The number of tablet terminals 2 and 3 forming the display system 1 is not limited. Each of the tablet terminal 2 and the tablet terminal 3 may be a single tablet terminal or may come in a plural number. This embodiment shows an example where the display system 1 includes one tablet terminal 2 and a plurality of tablet terminals 3.

The tablet terminal 2 and the tablet terminal 3 are an example of a portable computer used by a user. Each of the tablet terminals 2, 3 is a mobile terminal having a flat plate-like main body with a built-in battery (not illustrated). Each of the tablet terminals 2, 3 has at least an operation unit operated by the user, a display unit which displays an image or the like, and a control unit which executes a control function. Specifically, the tablet terminal 2 has a touch panel 201 as an operation unit and display unit, and has a control unit 210. The tablet terminal 3 has a touch panel 301 as an operation unit and display unit, and has a control unit 310.

The tablet terminal 2 corresponds to a second terminal. The tablet terminal 3 corresponds to a first terminal.

The tablet terminal 2 and the tablet terminal 3 are allocated, for example, to users having different roles. The user operating the tablet terminal 2 is, for example, moderator. The user using the tablet terminal 3 is participant. For example, if the display system 1 is used in an education, the user diving the education (for example, a teacher) uses the tablet terminal 2 and the user receiving the education (for example, a student) uses the tablet terminal 3.

The projector 100 projects an image based on data transmitted from the tablet terminal 2 or the tablet terminal 3. The projector 100 may be connected to an image supply device such as a PC (personal computer) or a media playback device for playing back a DVD or the like, and may project an image based on an image signal outputted from the image supply device.

Each of the touch panels 201, 301 includes a display panel having a liquid crystal display panel or organic EL panel, and a touch sensor for detecting a touch operation, on top of the display panel. The tablet terminals 2, 3 detect a touch of a user's finger or hand on the touch panels 201, 301 and execute an operation based on the detected touch position. The touch panel 301 is equivalent to the display unit of the tablet terminal 3.

In the display system 1, the projector 100 and the tablet terminal 2 are connected in such a way as to be able to communicate with each other, and the projector 100 and the tablet terminal 3 are connected in such a way as to be able to communicate with each other. The tablet terminal 2 and the tablet terminal 3 can also communicate with each other. As a configuration example, the display system 1 includes a communication device 4. The communication device 4 forms a wireless communication network including the tablet terminals 2, 3. The communication device 4 and the projector 100 are connected in such a way as to be able to communicate with each other via a cable.

The communication method between devices in the display system 1 is not limited to the above configuration. The tablet terminal 2 and the tablet terminal 3 may execute, for example, direct communication in an ad-hoc mode of wireless LAN (local area network) The projector 100 may be configured to execute wireless communication with the tablet terminal 2 and/or the tablet terminal 3, without having the communication device 4 in the display system 1. The projector 100 may also be configured to execute wireless communication with the communication device 4.

Figure 2:
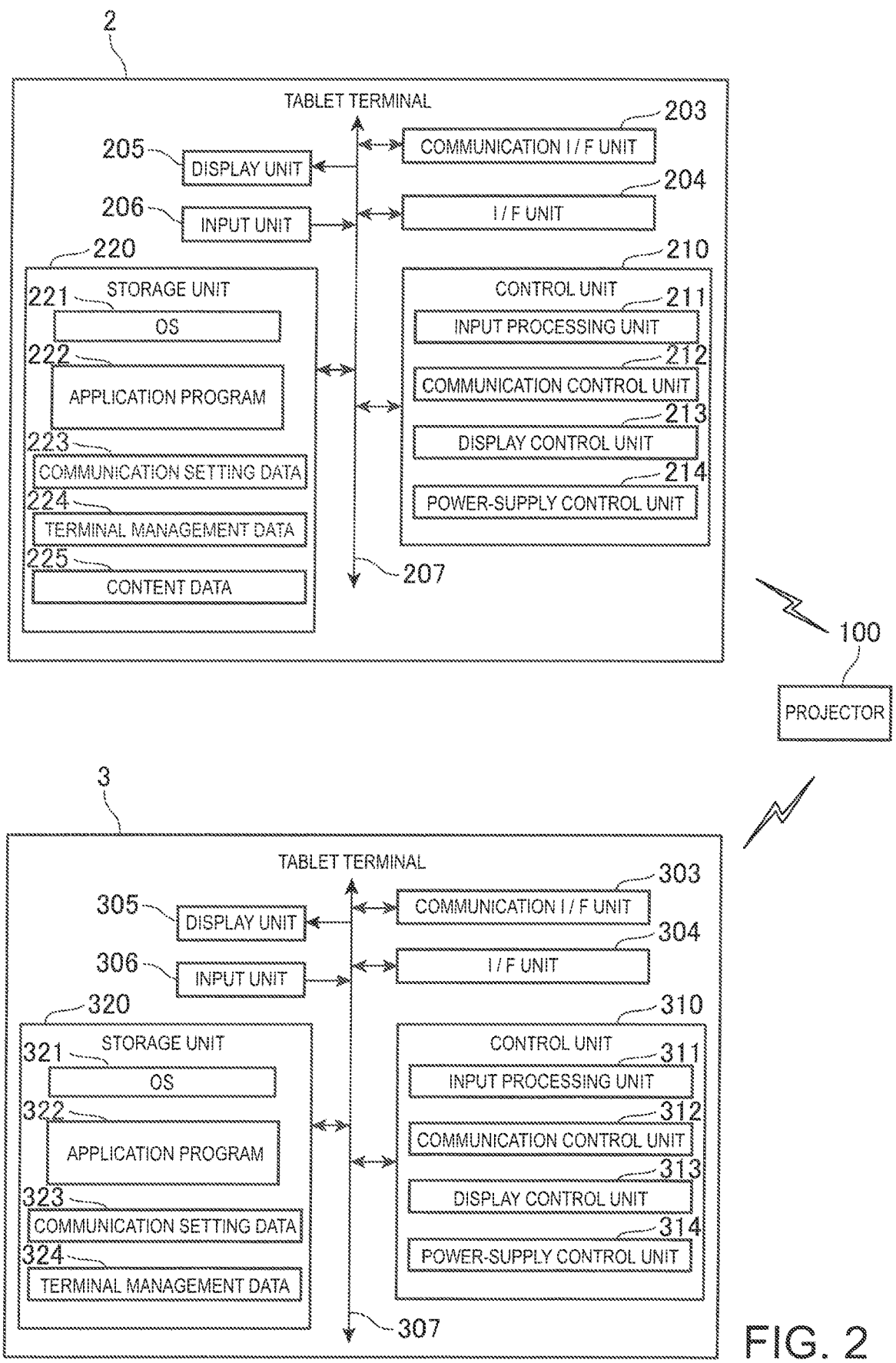
FIG. 2 is a functional block diagram of a tablet terminal.

FIG. 2 is a functional block diagram of the tablet terminal 2 and the tablet terminal 3.

The tablet terminal has a communication I/F (interface) unit 203 and an I/F (interface) unit 204. The communication I/F unit 203 executes communication with an external device. The communication I/F unit 203 may be configured to execute wired communication such as Ethernet (trademark registered). However, in this embodiment, the communication I/F unit 203 executes wireless communication such as wireless LAN (including WiFi (trademark registered)) or Bluetooth (trademark registered). The tablet terminal 2 executes wireless communication with the communication device 4 via the communication I/F unit 203. As described above, the tablet terminal 2 may execute direct wireless communication with the tablet terminal 3 via the communication I/F unit 203.

The I/F unit 204 is an interface connecting an external device to the tablet terminal 2. The I/F unit 204 is, for example, a wired communication interface which has a connector for wired connection to connect to the external device via a wire, and an interface circuit supporting this connector. Specifically, IEEE 1394, USB (universal serial bus) or the like can be employed. Also, MHL (trademark registered) (mobile high-definition link), HDMI (trademark registered) (high-definition multimedia interface) or the like may be employed.

The tablet terminal 2 includes a control unit 210, a display unit 205, an input unit 206, and a storage unit 220. These units, along with the communication I/F unit 203 and the I/F unit 204, are connected to each other via a bus 207.

The control unit 210 has a processor (not illustrated) such as a CPU (central processing unit) or microcomputer. The control unit 210 causes the processor to execute a program, thus controlling each part of the tablet terminal 2. The control unit 210 may have a ROM (read only memory) which stores a control program executed by the processor in a non-volatile manner, and a RAM (random access memory) forming a work area of the processor. The control unit 210 causes the processor to execute the program stored in the ROM and a program stored in the storage unit 220 and thus implements various functions of the tablet terminal 2 by the collaboration of the software and hardware.

The display unit 205 and the input unit 206 are connected to the touch panel 201. The display unit 205 displays various screens on the touch panel 201 under the control of the control unit 210. The input unit 206 detects a touch operation on the touch panel 201 and outputs coordinate data representing the position of the detected operation to the control unit 210.

If the tablet terminal 2 has hardware keys such as a power button (not illustrated) and a home button (not illustrated), the input unit 206 detects an operation of these hardware keys and outputs an operation signal representing the operated key to the control unit 210.

The storage unit 220 stores a program executed by the control unit 210 and various data in a non-volatile manner. The storage unit 220 stores an OS (operating system) 221, an application program 222, communication setting data 223, terminal management data 224, and content data 225.

The OS 221 is a program executed by the control unit 210. The OS 221 is loaded and executed by the control unit 210 at the startup of the tablet terminal 2 and executes basic functions of the tablet terminal 2. The OS 221 provides various basic functions as a platform where the application program 222 is executed. For example, as the control unit 210 executes the application program 222, the application program 222 invokes the function of the OS 221 is an API (application programming interface) or the like and thus operates.

The application program 222 is a program executed by the control unit 210 and implements functions of the tablet terminal 2. The application program 222 corresponds to one or a plurality of functions of the tablet terminal 2. The tablet terminal 2 can be configured to have a plurality of application programs 222 corresponding to a plurality of functions. For example, the tablet terminal 2 has application programs 222 corresponding to the functions of playing back the content data 225, managing the tablet terminal 3, various settings, sending and receiving messages, editing documents, viewing documents, drawing, and the like.

A plurality of application programs 222 can be installed in the tablet terminal 2. In this case, the storage unit 220 stores an execution file forming the application programs 222 installed in the tablet terminal 2, and a setting file which defines an environment or the like for execution.

In this embodiment, the application program 222 for managing the tablet terminal 3 is installed in the tablet terminal 2. By causing the control unit 210 to execute the application program 222 for managing the tablet terminal 3, the tablet terminal 2 can execute the function of transmitting information to the tablet terminal 3 and the projector 100, or the like.

The control unit 210 executes the application programs 222 according to an operation on the touch panel 201, a preset schedule, or a command or the like received via the communication I/F unit 203 or the I/F unit 204.

The communication setting data 223 is setting data for communicating with the projector 100 via the communication unit 203. Specifically, communication setting data 223 includes information used by the tablet terminal 2 to access the projector 100 and establish communication with the projector 100. For example, the communication setting data 223 includes the network address of the projector 100 in the communication network including the projector 100 and the tablet terminal 2. The communication setting data 223 may include an ID and/or password for authentication transmitted to the projector 100 from a terminal such as the tablet terminal 2, or other information, when the projector 100 authenticates the terminal such as the tablet terminal 2. The communication setting data 223 may also include information for authentication used by the tablet terminal 2 to authenticate the projector 100.

The terminal management data 224 includes information about the tablet terminal 3 forming the display system 1. Specifically, the terminal management data 224 includes, for example, a unique ID of each tablet terminal 3 as information that can identify each tablet terminal 3. The terminal management data 224 may also include the network address of each tablet terminal 3 in the communication network including the tablet terminal 2 and the tablet terminal 3. The terminal management data 224 may also include an ID or password for authentication used by the tablet terminal 3 to authenticate the tablet terminal 2 or by the tablet terminal 2 to authenticate the tablet terminal 3.

The display system 1 may use only one or some of the tablet terminals 3 forming the display system 1 in an event (lesson) carried out by the moderator operating the tablet terminal 2. in this case, the terminal management data 224 includes information about the tablet terminal 3 that is used.

The content data 225 is data for display made up of a still image or dynamic image (video). The content data 225 may also include audio data.

The control unit 210 has an input processing unit 211, a communication control unit 212, a display control unit 213, and a power-supply control unit 214, as functional blocks representing functions of the control unit 210. These functional blocks are implemented by the collaboration of the software and hardware as the processor of the control unit 210 executes a program stored in the storage unit 220 or the ROM (not illustrated). For example, the OS 221 may include the functions of the input processing unit 211, the communication control unit 212, the display control unit 213, and the power-supply control unit 214. A part or these functional blocks may be implemented by the application program 222.

The input processing unit 211 specifies the content of an input, based on the operation position of a touch operation detected by the input unit 206. If an operation signal representing an operation of a hardware key is inputted from the input unit 206, the input processing unit 211 detects the operation of the hardware key.

The communication control unit 212 controls the communication I/F unit 203 and the I/F unit 204 and thus executes communication between the tablet terminal 2 and an external device. The communication control unit 212 executes, for example, wireless communication with the tablet terminal 3 or the projector 100 via the communication I/F unit 203.

The display control unit 213 controls and causes the display unit 205 to display various images on the touch panel 201. The display control unit 213 carries out processing to change the display on the touch panel 201 according to the input content specified by the input processing unit 211. The display control unit 213 also executes processing to play back the content data 225 stored in the storage unit 220 and causes the display unit 205 to display an image based on the content data 225.

The power-supply control unit 214 controls the operation state of each part of the tablet terminal 2. Specifically, the power-supply control unit 214 switches the operation state of the tablet terminal 2 between a normal operation state, a standby state (power-saving state), and a halt state. The halt state is the state where the power of the tablet terminal 2 is off. The standby state is the power-saving state of the tablet terminal 2 and is also called a sleep state. In the tablet, terminal 2 in the standby state, the I/F unit 204, the display unit 205, and the input unit 206 stop, and the control unit 210 and the storage unit 220 operate intermittently. This reduces power consumption.

The tablet terminal 3 is a terminal device configured similarly to the tablet terminal 2. The tablet terminal 3 has a communication I/F unit 303, an I/F unit 304, a display unit 305, an input unit 306, a control unit 310, and a storage unit 320. These units are connected to each other via a bus 307.

The communication I/F unit 303 (communication unit) is configured, for example, similarly to the communication I/F unit 203 and executes communication with an external device such as the projector 100 or the tablet terminal 2. The communication I/F unit 303 may execute communication via the communication device 4 or may execute direct wireless communication with the tablet terminal 2 or the projector 100.

The I/F unit 304 is an interface connecting an external device to the tablet terminal 3 and is configured, for example, similarly to the I/F unit 204.

The control unit 310 has a processor (not illustrated) such as a CPU or microcomputer. The control unit 310 causes the processor to execute a program, thus controlling each part of the tablet terminal 3. The control unit 310 may have a ROM which stores a control program executed by the processor in a non-volatile manner, and a RAM forming a work area of the processor. The control unit 310 causes the processor to execute the program stored in the ROM and a program stored in the storage unit 320 and thus implements various functions of the tablet terminal 3 by the collaboration of the software and hardware.

The display unit 305 and the input unit 306 are connected to the touch panel 301. The display unit 305 displays various screens on the touch panel 301 under the control of the control unit 310. The input unit 306 detects a touch operation on the touch panel 301 and outputs coordinate data representing the position of the detected operation to the control unit 310.

If the tablet terminal 3 has hardware keys such as a power button (not illustrated) and a home button (not illustrated), the input unit 306 detects an operation of these hardware keys and outputs an operation signal representing the operated key to the control unit 310.

The storage unit 320 stores a program executed by the control unit 310 and various data in a non-volatile manner. The storage unit 320 stores an OS 321, an application program 322, communication setting data 323, and terminal management data 324.

The OS 321 is a program executed by the control unit 310. The OS 321 is loaded and executed by the control unit 310 at the startup of the tablet terminal 3 and executes basic functions of the tablet terminal 3. The OS 321 provides various basic functions as a platform where the application program 322 is executed. For example, as the control unit 310 executes the application program 322, the application program 322 invokes the function of the OS 321 via an API and thus operates.

The application program 322 (application) is a program executed by the control unit 310 and implements functions of the tablet terminal 3. The application program 322 corresponds to one or a plurality of functions of the tablet terminal 3. The tablet terminal 3 can be configured to have a plurality of application programs 322 corresponding to a plurality of functions. For example, the tablet terminal 3 has application programs 322 corresponding to the functions of managing the tablet terminal 3, various settings, sending and receiving messages, editing documents, viewing documents, drawing, and the like.

A plurality of application programs 322 can be installed in the tablet terminal 3. In this case, the storage unit 320 stores an execution file forming the application programs 322 installed in the tablet terminal 3, and a setting file which defines an environment or the like for execution.

In this embodiment, the application program 322 for connecting to the projector 100 is installed in the tablet terminal 3. By causing the control unit 310 to execute the application program 322, the tablet terminal 3 connects to and establishes wireless communication with the projector 100. The tablet terminal 3 also displays an image on the touch panel 301 based on the terminal management data 324 or the like, according to a command transmitted from the projector 100.

The control unit 310 executes the application programs 322 according to an operation on the touch panel 301, a preset schedule, or a command or the like received via the communication I/F unit 303 or the I/F unit 304.

The communication setting data 323 is setting data for communicating with the projector 100 via the communication I/F unit 303. Specifically, the communication setting data 323 includes information used by the tablet terminal 3 to access the projector 100 and establish communication with the projector 100. For example, the communication setting data 323 includes the network address of the projector 100 in the communication network including the projector 100 and the tablet terminal 3. The communication setting data 323 may include an ID and/or password for authentication transmitted to the projector 100 from a terminal such as the tablet terminal 3, or other information, when the projector 100 authenticates the terminal such as the tablet terminal 3. The communication setting data 323 may also include information for authentication used by the tablet terminal 3 to authenticate the projector 100.

The terminal management data 324 is data for the tablet terminal 3 to display an image or the like on the touch panel 301. The terminal management data 324 is made up of, for example, image data, video data, document data, or the like and is stored in a file format. The storage unit 320 can store a plurality of terminal management data 324 and can univocally specify the terminal management data 324, based on the file name of the terminal management data 324 and its file path in the storage unit 320. For example, the terminal management data 324 is a PDF (portable document format) file or presentation file.

The tablet terminal 3 may store the terminal management data 324 having a file path and a file name that are designated in advance, and the tablet terminal 2 may have the file path and the file name of the terminal management data 324. In this case, the terminal management data 224 stored in the tablet terminal 2 includes information specifying the tablet terminal 3 and the file path and the file name of the terminal management data 324 stored in the tablet terminal 3.

The tablet terminal 3 may also acquire data from the projector 100, the tablet terminal 2 or other devices via the communication I/F unit 303 or the I/F unit 304, and store the acquired data as the terminal management data 324.

The control unit 310 has an input processing unit 311, a communication control unit 312, a display control unit 313, and a power-supply control unit 314, as functional blocks representing functions the control unit 310. These functional blocks are implemented by the collaboration of the software and hardware as the processor of the control unit 310 executes a program stored in the storage unit 320 or the ROM (not illustrated). For example, the OS 321 may include the functions of the input processing unit 311, the communication control unit 312, the display control unit 313, and the power-supply control unit 314. A part of these functional blocks may be implemented by the application program 322.

The input processing unit 311 specifies the content of an input, based on the operation position of a touch operation detected by the input unit 306. If an operation signal representing an operation of a hardware key is inputted from the input unit 306, the input processing unit 311 detects the operation of the hardware key.

The communication control unit 312 controls the communication I/F unit 303 and the I/F unit 304 and thus executes communication between the tablet terminal 3 and an external device. The communication control unit 312 executes, for example, wireless communication with the tablet terminal 2 or the projector 100 via the communication I/F unit 303.

The display control unit 313 controls and causes the display unit 305 to display various images on the touch panel 301. The display control unit 313 carries out processing to change the display on the touch panel 301 according to the input content specified by the input processing unit 311.

The power-supply control unit 314 controls the operation state of each part of the tablet terminal 3. Specifically, the power-supply control unit 314 switches the operation state of the tablet terminal 3 between a normal operation state, a standby state, and a halt state. The halt state is the state where the power of the tablet terminal 3 is off. The standby state is the power-saving state of the tablet terminal 3. In the tablet terminal 3 in the standby state, the I/F unit 304, the display unit 305, and the input unit 306 stop, and the control unit 310 and the storage unit 320 operate intermittently. This reduces power consumption.

In the standby state, the tablet terminal 3 can receive a command via the communication I/F unit 303. That is, in the standby state, the communication I/F unit 303 is enabled to detect and receive a wireless signal. To receive a wireless signal, the communication I/F unit 303 executes a reception operation of periodically trying to receive a wireless signal. Specifically, the communication I/F unit 303 executes an intermittent reception operation in which a period of trying to receive a wireless signal (hereinafter referred to as a window period) and a period of not receiving are periodically repeated. The duration of the window period of the communication I/F unit 303, and the duty of the window period in one cycle of the intermittent reception operation can be changed under the control of the control unit 310.

In the standby state, at least one of the duration of the window period and the duty of the window period is changed in such a way that more power is saved than in the normal operation. Specifically, the window period is set to be shorter or the duty of the window period is set to be smaller than in the normal operation state.

If control unit 310 detects a predetermined command via the communication I/F unit 303 after shifting from the normal operation state to the standby state, the control unit 310 returns to the normal operation state from the standby state.

If the detect command designates the execution of an application program 322, the control unit 310 executes the designated application program 322.

Figure 3:
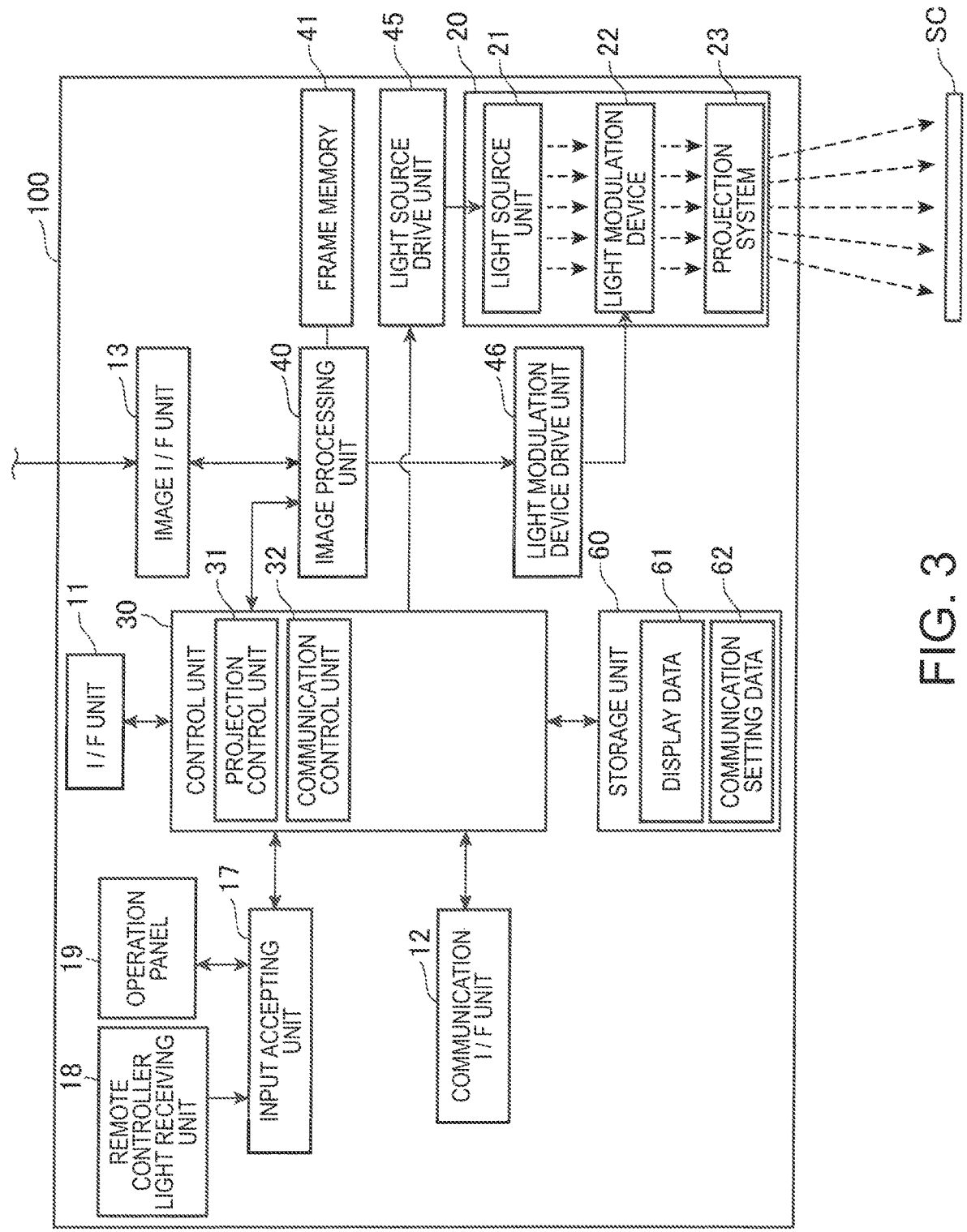
FIG. 3 is a functional block diagram of a projector.

FIG. 3 is a functional block diagram of the projector 100.

The projector 100 has an I/F unit 11, a communication I/F unit 12, and an image unit 13, as interfaces to connect to an external device. The I/F unit 11 has, for example, connector for wired connection to an external device, and an interface circuit corresponding to this connector. Specifically, an interface conforming to IEEE 1394, USB or the like can be employed.

The communication I/F unit 12 is a communication interface which executes communication with an external device, and is made up of a wired communication interface or a wireless communication interface. For example, the communication I/F unit 12 supports a wireless LAN (including WiFi) Bluetooth, Miracast (trademark registered) or the like. The communication I/F unit 12 communicates with the tablet terminal 2 and/or the tablet terminal 3 via the communication device 4. The communication I/F unit 12 may also be configured to execute direct wireless communication with the tablet terminals 2, 3 without using the communication device 4.

The image I/F unit 13 is configured as an image input interlace of DVI, D terminal, S terminal, composite, D-Sub or the like. The image I/F unit 13 may have an interface to which audio data is inputted. The image I/F unit 13 is connected, for example, to the foregoing image supply device. Digital image data or an analog image signal is inputted to the image I/F unit 13.

For example, the wireless communication interface including an antenna, an RF circuit, and a modulation/demodulation circuit may be employed.

The projector 100 has a projection unit 20 which forms an optical image. The projection unit 20 has a light source unit 21, a light modulation device 22, and a projection system 23. The light source unit 21 has a light source made up of a xenon lamp, ultra-high-pressure mercury lamp, LED or laser light source.

The light modulation device 22 modulates light emitted from the light source unit 21, thus generates image light, and emits the image light to the projection system 23. The light modulation device 22 has, for example, three transmission-type liquid crystal panels corresponding to the three primary colors of RGB and modulates light transmitted through these liquid crystal panels.

The projection system 23 guides the image light modulated by the light modulation device 22 into the direction of the screen SC and forms an image on the screen SC. The projection system 23 may also have a zoom mechanism which enlarges and reduces a projection image, and a focusing adjustment mechanism which adjusts the focusing.

The projection unit 20 is connected to a light source drive unit 45 which turns on the light source unit 21 under the control of a control unit 30, and a light modulation device drive unit 46 which actuates the light modulation device 22 under the control of the control unit 30. The light source drive unit 45 may have the function of switching on and off the light source unit 21 and adjusting the amount of light of the light source unit 21.

The projector 100 has an image processing system which processes an image projected by the projection unit 20. The image processing system includes the control unit 30 controlling the projector 100, a storage unit 60, an input accepting unit 17 an image processing unit 40, the light source drive unit 45, and the light modulation device drive unit 46. A frame memory 41 may be connected to the image processing unit 40. The frame memory 41 may be included in the image processing system.

The control unit 30 has a processor (not illustrated) such as a CPU or microcomputer. The control unit 30 causes the processor to execute a program, thus controlling each part of the projector 100. The control unit 30 may have a ROM which stores a control program executed by the processor in a non-volatile manner, and a RAM forming a work area of the processor. The control unit 30 causes the processor to execute the program stored in the ROM and a program stored in the storage unit 60 and thus implements various functions of the projector 100 by the collaboration of the software and hardware.

The storage unit 60 stores a program executed by the control unit 30 and various data processed by the control unit 30, in a non-volatile manner.

The data stored in the storage unit 60 includes display data 61 and communication setting data 62.

The display data 61 is data received from the tablet terminal 2 or the tablet terminal 3 via the communication I/F unit 12 and displayed by the projection unit 20. The display data 61 is made up of image data or dynamic image data.

The communication setting data 62 (connection information) is data about the tablet terminal 3 with which the projector 100 can communicate via the communication I/F unit 12. That is, the communication setting data 62 is necessary setting data for the projector 100 to communicate with the tablet terminal 3. Specifically, the communication setting data 62 includes the network address of the tablet terminal 3 in the communication network including the projector 100 and the tablet terminal 3. The communication setting data 62 may also include an ID and/or password for authentication transmitted to the projector 100 from the tablet terminal 3, or other information, when the projector 100 authenticates the tablet terminal 3.

The image processing unit 40 processes image data under the control of the control unit 30 and outputs an image signal to the light modulation device drive unit 46. The processing executed by the image processing unit 40 includes discrimination between a 3D (stereo) image and a 2D (planar) image, resolution conversion, frame rate conversion, distortion correction, digital zoom, color tone correction, luminance correction, and the like. The image processing unit 40 executes processing designated by the control unit 30 and uses a parameter inputted from the control unit 30, when necessary, to carry out the processing. Of course, a combination of a plurality of types of the foregoing processing can be executed.

The image processing unit 40 is connected to the frame memory 41. The image processing unit 40 processes image data inputted to the image I/F unit 13, as input image data. If the control unit 30 transfers image data inputted to the I/F unit 11 to the image processing unit 40, the image processing unit 40 processes the image data transferred by the control unit 30, as input image data. The image data inputted to the I/F unit 11 includes, for example, the display data 61 acquired by the projector 100 from an external device under the control of the control unit 30.

The image processing unit 40 loads the input image data into the frame memory 41 and draws an image in the frame memory 41. The image processing unit 40 executes the foregoing various types of processing on the image loaded in the frame memory 41.

The image processing unit 40 reads out the processed image data from the frame memory 41, generates R, G, B image signals corresponding to this image data, and outputs the image signals to the light modulation device drive unit 46, if the image data inputted to the image I/F unit 13 is, for example, dynamic image made up of sequential frames, the image processing unit 40 loads each frame into the frame memory 41. In this case, the image processing unit 40 successively loads frames inputted from the image I/F unit 13 into the frame memory 41 and causes the projection unit 20 to project the frames.

The light modulation device drive unit 45 is connected to the liquid crystal panels of the light modulation device 22. The light modulation device drive unit 46 drives the liquid crystal panels, based on the image signals inputted from the image processing unit 40 and thus causes an image to be drawn on each liquid crystal panel.

The input accepting unit 17 is connected to a remote controller light receiving unit 18 and an operation panel 19 and detects an operation on the remote controller light receiving unit 18 and the operation panel 19. The remote controller light receiving unit 18 and the operation panel 19 function as an input device.

The remote controller light receiving unit 18 receives an infrared signal transmitted from a remote controller (not illustrated) used by the user of the projector 100, in response to a button operation. The remote controller light receiving unit 18 decodes the infrared signal received from the remote controller, generates operation data representing the content of the operation on the remote controller, and outputs the operation data to the control unit 30.

The operation panel 19 is provided on the outer casing of the projector 100 and has various switches and an indicator lamp. The input accepting unit 17, under the control of the control unit 30, properly turns on and off the indicator lamp on the operation panel 19 according to the operation state and the setting state of the projector 100. When a switch on the operation panel 19 is operated, operation data corresponding to the operated switch is outputted from the input accepting unit 17 to the control unit 30.

The control unit 30 reads out and executes a control program stored in the storage unit 60. The control unit 30 thus implements the functions of a projection control unit 31 and a communication control unit 32 and controls each part of the projector 100.

The projection control unit 31 acquires the content of an operation carried out by the user operating the remote controller, based on operation data inputted from the input accepting unit 17. The projection control unit 31 controls the image processing unit 40, the light source drive unit 45, and the light modulation device drive unit 46 according to the operation carried out by the user and thus causes an image to be projected on the screen SC.

The projection control unit 31 also controls and causes the image processing unit 40 to execute the foregoing processing such as discrimination between a 3D (stereo) image and a 2D (planar) image, resolution conversion, frame rate conversion, distortion correction, digital zoom, color tone correction, and luminance correction. The projection control unit 31 also controls the light source e drive unit 45 according to the processing by the image processing unit 40 and thus controls the amount of the light source unit 21.

The communication control unit 32 communicates with an external device via the I/F unit 11 and the communication I/F unit 12.

In the display system 1 thus configured, the tablet terminal 2 executes the application program 222 and thus functions as a moderator machine used by a moderator. Specifically, the tablet terminal 2 wirelessly communicates with the projector 100 and causes the projector 100 to display an image displayed on the touch panel 201 by the tablet terminal 2.

The tablet terminal 2 also designates content to the tablet terminal 3 and instructs the tablet terminal 3 to display the content. For example, the tablet terminal 2 transmits to the tablet terminal 3 a command which designates the terminal management data 324 to be displayed by the tablet terminal 3 and a part to be displayed of the terminal management data 324. The tablet terminal 3 displays on the touch panel 301 an image based on the terminal management data 324 designated by the command transmitted from the tablet terminal 2.

Also, transmitting a command from the tablet terminal 2 to the tablet terminal 3 after the tablet terminal 3 shifts to the standby state can return the tablet terminal 3 from the standby state to the normal operation state. In this case, the tablet terminal 3 executes the application program 322 designated by the tablet terminal 2.

Figure 4:
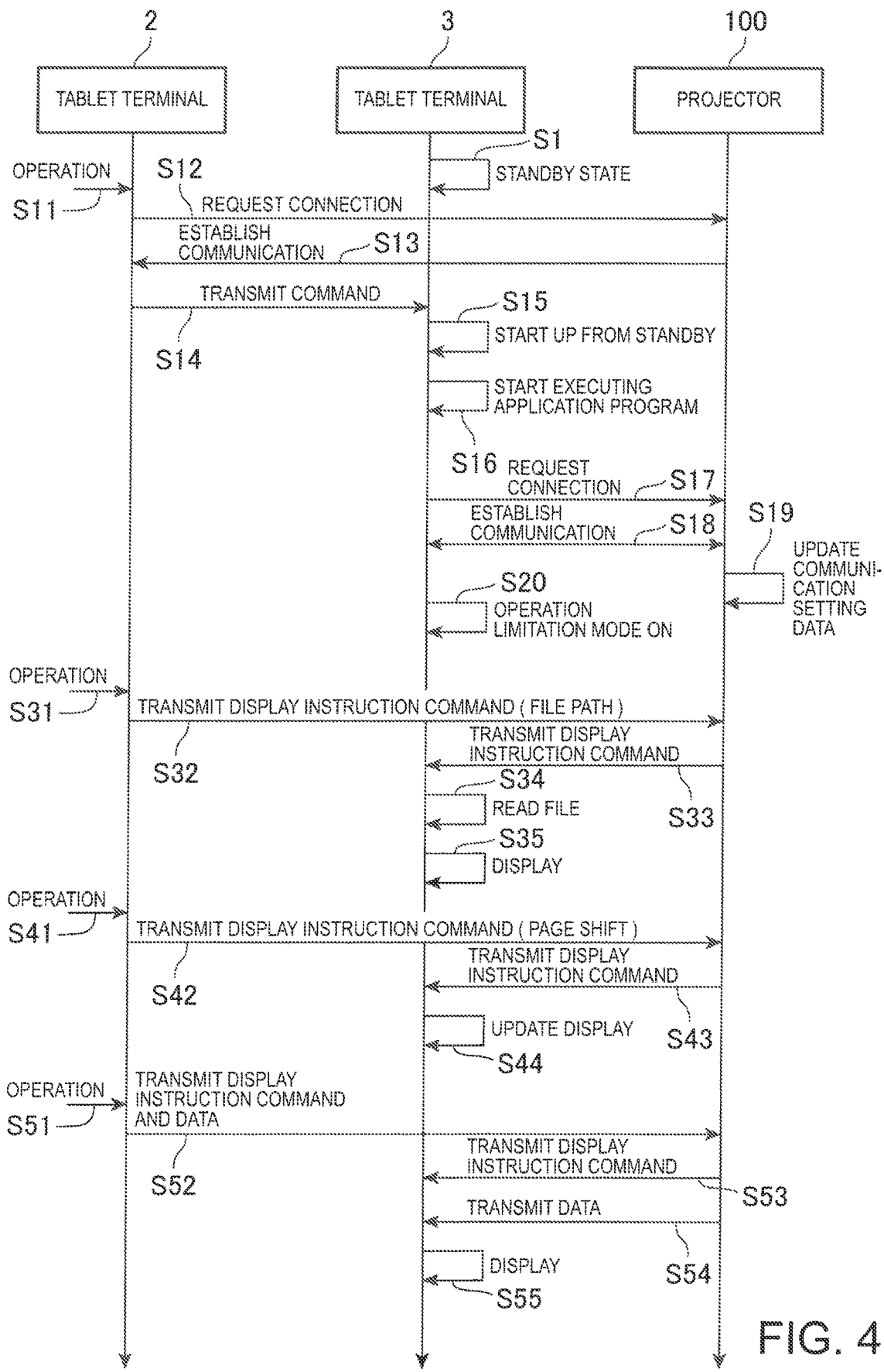
FIG. 4 is a sequence chart showing operations of the display system.

FIG. 4 is a sequence chart showing operations of the display system 1. FIGS. 5, 6, 7, 8, and 9 show display examples shown by the tablet terminal 2 when the operations shown in FIG. 4 are executed.

The display system 1 executes the operations of FIG. 4 in the state where the tablet terminal 2, the tablet terminal and the communication device 4 have not established communication with each other.

At the start of the operations of FIG. 4, the tablet terminal 3 is already started up and in the normal operation state or in the standby state. Particularly in this embodiment, the tablet terminal 3 is in the standby state, waiting for access from an external device (step S1).

If the tablet terminal 2 is instructed to connect to the projector 100 by an operation on the touch panel 201 (step S11), the tablet terminal 2 sends a connection request to the projector 100 (step S12). The projector 100 responds to this connection request and thus establishes communication between the tablet terminal 2 and the projector 100 (step S13).

Figure 5:
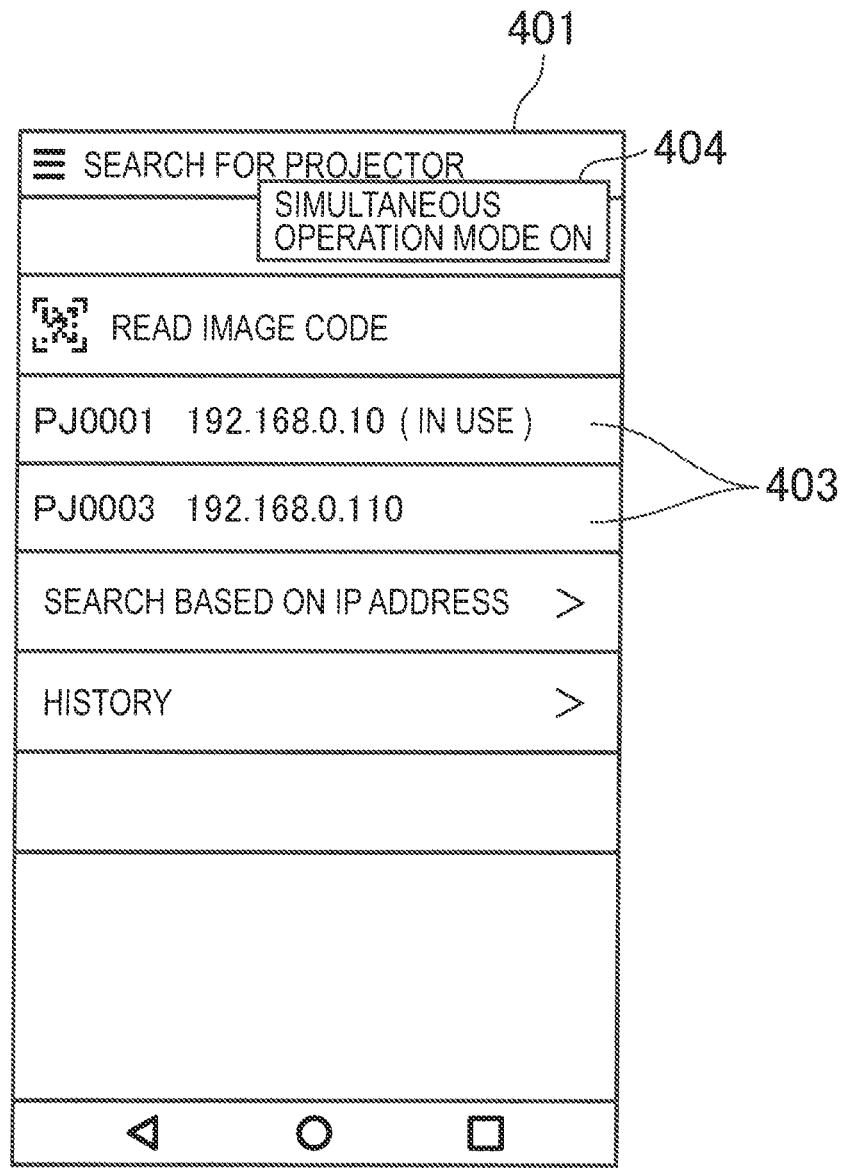
FIG. 5 shows a display example on the tablet terminal.
Figure 6:
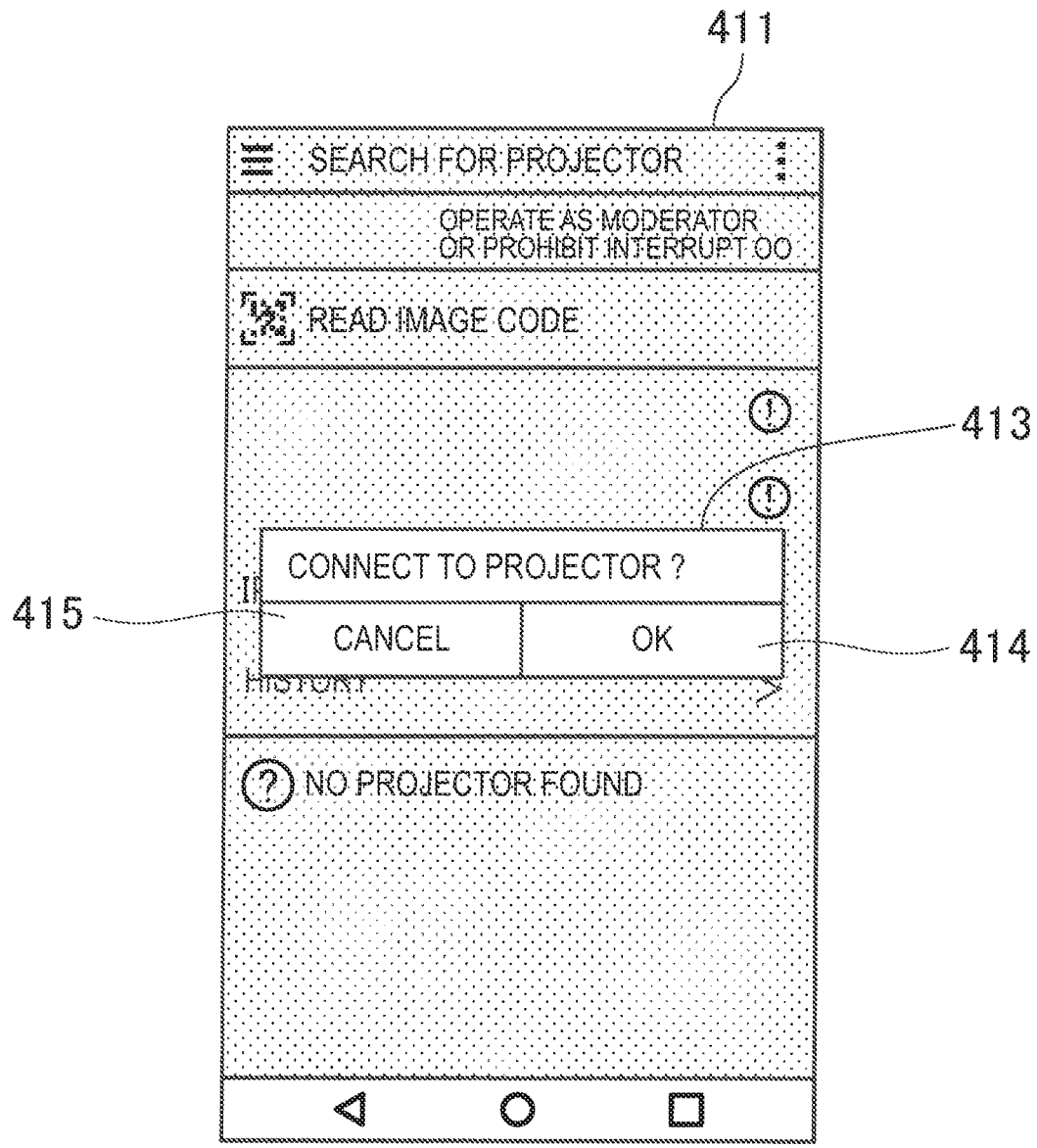
FIG. 6 slaws a display example on the tablet terminal.

FIGS. 5 and 6 show display examples of an operation screen 401 displayed by the tablet terminal 2.

The operation screen 401 shown in FIG. 5 has a display area 403 showing a list of projectors (including the projector 100) to which the tablet terminal 2 can connect. An instruction button 404 is arranged on the operation screen 401. The instruction button 404 is a button which designates the execution of a "simultaneous operation mode" in which a plurality of tablet terminals 3 forming the display system 1 simultaneously displays an image. The instruction button 404 is configured as a GUI (graphical user interface) on the touch panel 201.

The user carries out a touch operation on the touch panel 201 and operates the instruction button 404. This causes the tablet terminal 2 to switch the screen displayed on the touch panel 201 to an operation screen 411 shown in FIG. 6. The operation screen 411 of FIG. 6 shows the operation screen 401 and an instruction window 413 superimposed thereon, with the parts other than the instruction window 413 being grayed out.

The instruction window 413 has an instruction button 414, which is a button to designate connection to the projector 100, and a cancel button 415 to designate the cancelation of an operation. A touch operation of the cancel button 415 causes the tablet terminal 2 to erase the display of the instruction window 413 and shift to the operation screen 401.

An operation of the instruction button 414 by the user corresponds to the operation of step S11. A touch operation of the instruction button 414 by the user causes the tablet terminal 2 to execute the operation of step S12 in response to this touch operation.

Back to FIG. 4, after establishing communication with the projector 100 in step S13, the tablet terminal 2 transmits a command (control information) to the tablet terminal 3 (step S14). In Step S14, the tablet terminal 2 may decide a destination of a command, based on information included in the terminal management data 224, and then transmit the command. In this case, the command is transmitted to the tablet terminal 3 whose information is included in the terminal management data 224. The tablet terminal 2 may also transmit a command by a so-called broadcast packet, which can be received by all the devices belonging to the communication network including the tablet terminal 2.

The tablet terminal 3 receives the command transmitted from the tablet terminal 2, starts up from the standby state, and shifts to the normal operation state (step S15). The tablet terminal 3 causes the control unit 310 to start executing the application program 322 (step S16).

The tablet terminal 3 may be set in advance to shift to the normal operation state and start executing the application program 322 on receiving a command from the tablet terminal 2 in the standby state. In this case, the command transmitted from the tablet terminal 2 in step S14 may be any command that the tablet terminal 3 can receive. The command may be, for example, a magic packet used in the known Wake-on-LAN technique. The command transmitted from the tablet terminal 2 in step S14 may also include a command designating a shift to the normal operation state and a command designating the execution of the application program 322.

The tablet terminal 3, by the function of the application program 322, tries to communicate with the projector 100 and request the projector 100 to connect to the tablet terminal 3 (step S17). The application program 322 is, for example, a program to automatically try to communicate with the projector 100 after startup. The application program 322 may use information of the projector 100 included in the communication setting data 323 when trying communication.

After the tablet terminal 3 sends connection request to the projector 100 in step S17, the projector 100 responds to the connection request and thus establishes communication between the tablet terminal 3 and the projector 100 (step S18).

The projector 100 updates the communication setting data 62 in such a way that the communication set data 62 eludes information about the tablet terminal 3 with which the projector 100 has established communication (step S19).

If the display system 1 includes a plurality of tablet terminals 3, the tablet terminal 2 may transmit a command to the plurality of tablet terminals 3 in step S14, and the plurality of tablet terminals 3 may send a connection request to the pro tor 100 in step S17. In this case, the projector 100 establishes, in step S18, communication with each of the plurality of tablet terminals 3 requesting connection, and updates the communication setting data 62 in such a way that the communication setting data 62 includes information about each tablet terminal 3.

Figure 7:
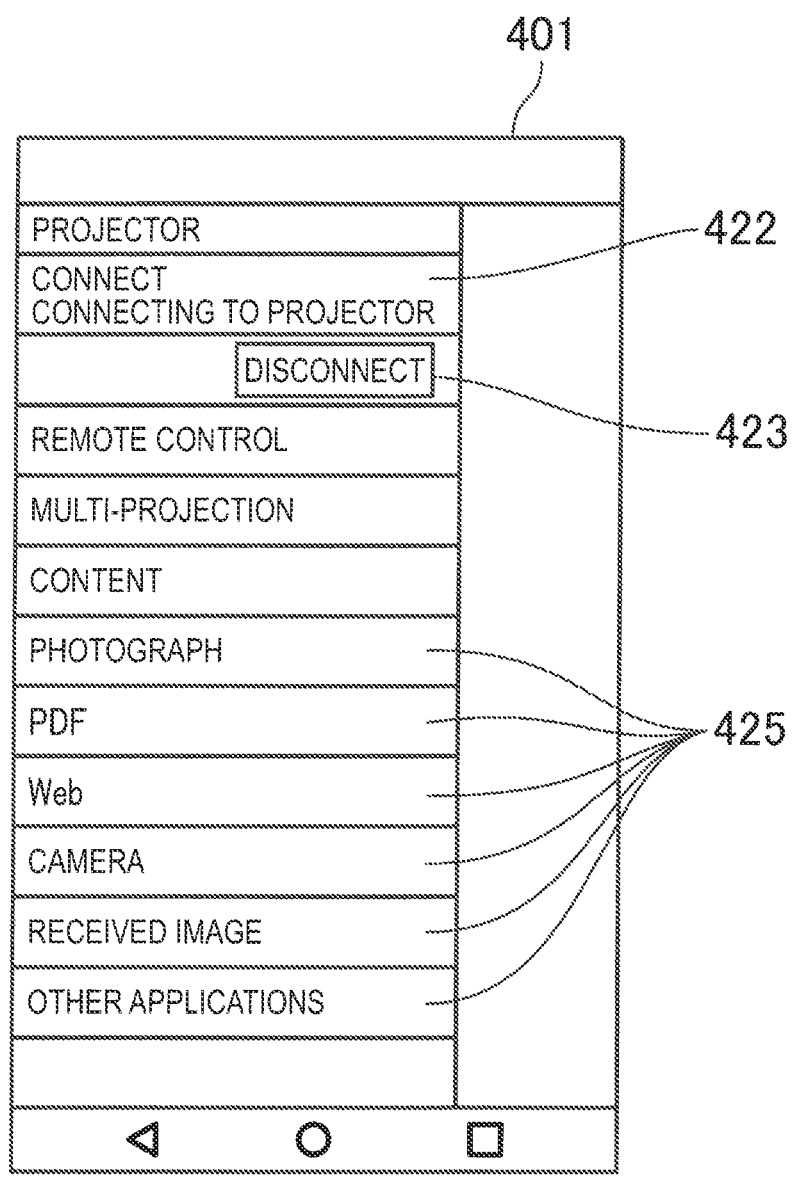
FIG. 7 shows a display example on the tablet terminal.

FIG. 7 shows a display example of an operation screen 421 displayed by the tablet terminal 3.

The operation screen 421 is displayed on the touch panel 301 when the tablet terminal 3 executes the application program 322 in step S16. The operation screen 421 includes a connection guide display 422 showing that communication with the projector 100 is being tried, and a disconnection instruction button 423 designating the disconnection of communication with the projector 100. Also, a content designation section 425 for selecting content stored in the tablet terminal 3 may be arranged on the operation screen 421.

The tablet terminal 3 displays the operation screen 421 from the start of the execution of the application program 322 in step S16 until communication with the projector 100 is established in step S18.

Back to FIG. 4, after establishing communication with the projector 100, the tablet terminal 3 switches on an operation limitation mode (step S20). The operation limitation mode is an operation mode of the tablet terminal 3 in which touch operations on the touch panel 301 are disabled. As the operation limitation is started, the input processing unit 311 disables touch operations on the touch panel 301 detected by the input unit 306. Therefore, during the execution of the operation limitation mode, the tablet terminal 3 cannot be operated by touch operations on the touch panel 301. In the operation limitation mode, the control unit 310 may switch the operation screen 421 (FIG. 7) displayed on the touch panel 301 to grayout.

If the tablet terminal 3 has hardware keys (not illustrated) and the input unit 306 detects an operation on a hardware key in the operation limitation mode, the input processing unit 311 may be able to cancel the operation limitation mode in response to this operation. Also, though not illustrated, the tablet terminal 3 may switch off the operation limitation mode in response to a command transmitted from the tablet terminal 2 which instructs the tablet terminal 3 to cancel the operation limitation mode. In this case, the tablet terminal 3 becomes operable via the touch panel 301.

Subsequently, in the display system 1, the tablet terminal 2 can control the content displayed by the tablet terminal 3.

As a first example, the case where the user operating the tablet terminal 2 designates a display based on the terminal management data 324 stored in the tablet terminal 3 is described. In this example, the user carries out an operation (step S31), and in response to this operation, the tablet terminal 2 transmits to the tablet terminal 3 a display instruction command (display instruction information) designating data to be displayed (step S32). The display instruction command transmitted in step S32 includes, for example, a file path of the terminal management data 324 stored in the storage unit 320 of the tablet terminal 3. The file path is information designating a file that forms the terminal management data 324. The file path includes a path in the storage area of the storage unit 320.

Figure 8:
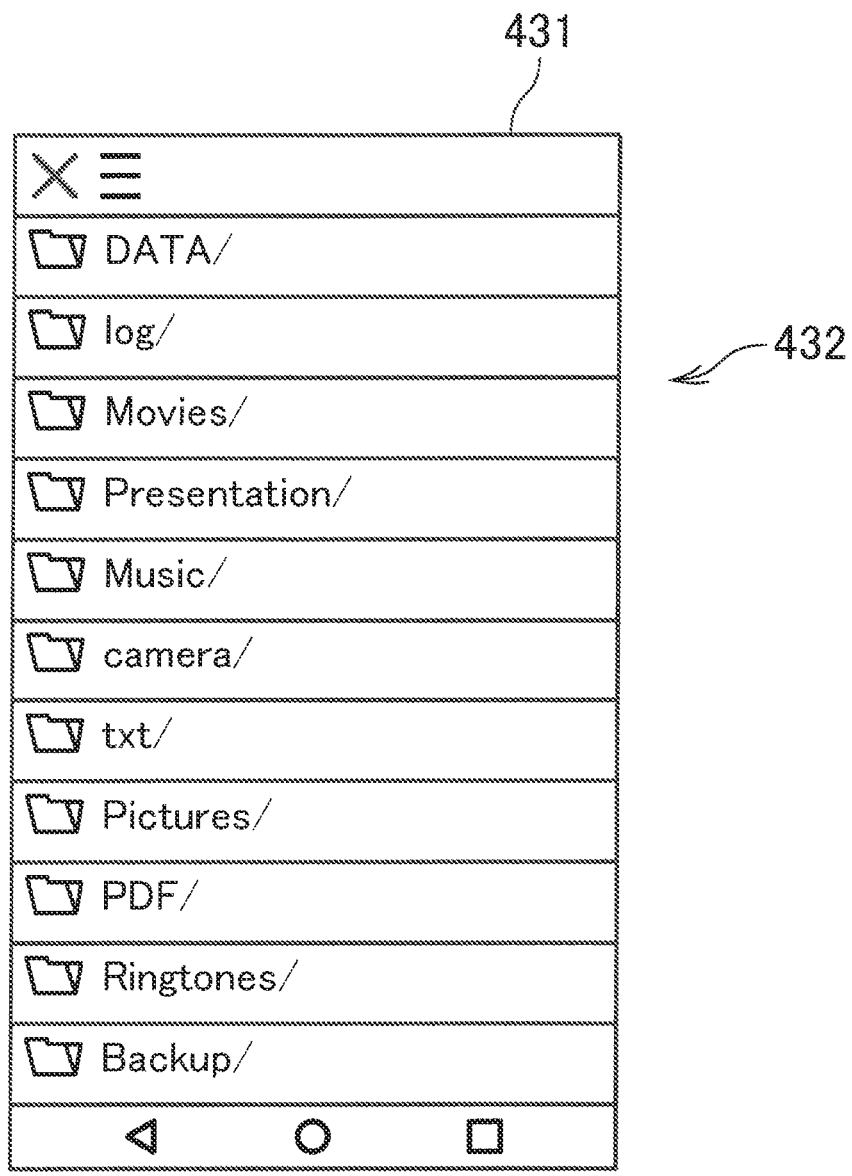
FIG. 8 shows a display example on the tablet terminal.

FIG. 8 shows a display example of an operation screen 431 displayed by the tablet terminal 2.

The operation screen 431 shown in FIG. 8 includes a file display section 432 showing a list of files and folders or directories) stored in the storage unit 320 of the tablet terminal 3. The configuration of the files, folders, or directories displayed in the file display section 432 represents the configuration in the storage unit 320. The tablet terminal 2 may store, for example, information about the configuration in the storage unit 320 as included in the terminal management data 224. Also, in a part of the storage unit 220 of the tablet terminal 2, a folder configuration (directory configuration) shared with the storage area for the terminal management data 324 in the storage unit 320 may be arranged.

In the state where the tablet terminal 2 displays the operation screen 431 on the touch screen 201, the user can carry out an operation of designating the terminal management data 324 by a touch operation on the touch panel 201. The tablet terminal generates a display instruction command including the path of a file designated by the touch operation and transmits the display instruction command in step S32.

Back to FIG. 4, in step S32, the tablet terminal 2 transmits the display instruction command to the projector 100. The projector 100 receives the display instruction command from the tablet terminal 2 and transmits the received display instruction command to the tablet terminal 3, based on the communication setting data 62 (step S33). The communication setting data 62 includes information about the tablet terminal 3 with which the projector 100 has established communication in step S18. Therefore, the display instruction command transmitted from the tablet terminal 2 is transferred to the tablet terminal 3 which has established communication with the projector 100.

The tablet terminal 3 receives the display instruction command from the projector 100 and reads the terminal management data 324 designated by the received display instruction command, from the storage unit 320 (step S34). The tablet terminal 3 displays an image or characters based on the terminal management data 324 thus read, on the touch panel 301 (step S35).

As a second example, the case where the user operating the tablet terminal 2 designates a shift from the displayed page when the tablet terminal 3 shows a display based on the terminal management data 324 is described. In this example, the user carries out an operation (step S41), and in response to this operation, the tablet terminal 2 transmits a display instruction command including an instruction to shift from the displayed page (step S42). The display instruction command transmitted in step S42 includes, for example, data designating a display target page of the terminal management data 324 displayed by the tablet terminal 3.

Figure 9:
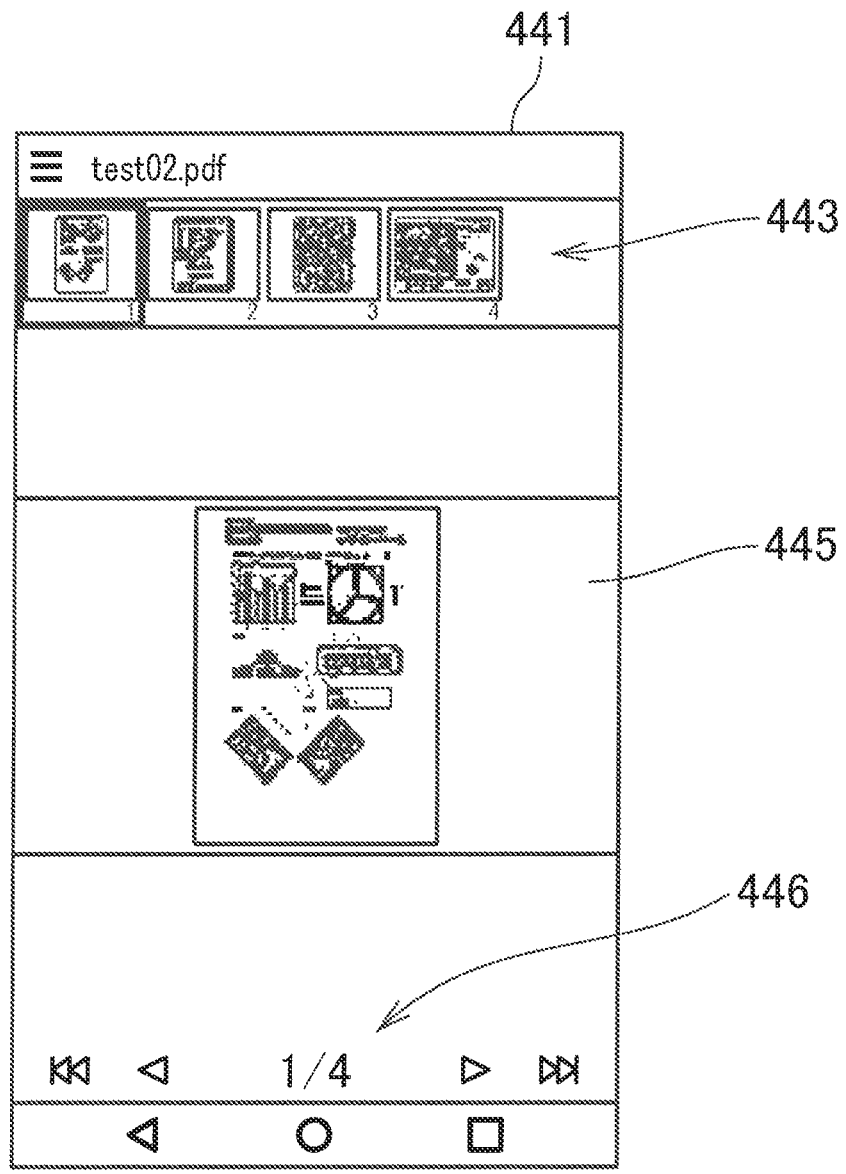
FIG. 9 shows a display example on the tablet terminal.

FIG. 9 shows a display example of an operation screen 441 displayed by the tablet terminal 2.

The operation screen 441 shown in FIG. 9 includes a thumbnail display section 443 showing a list of thumbnail images of pages included in the terminal management data 324 displayed by the tablet terminal 3. The operation screen 441 also includes a page display section 445 where the thumbnail image of the page displayed by the tablet terminal 3 is displayed. The operation screen 441 also includes a page shift instruction section 446. In the page shift instruction section 446, buttons to designate a shift from the displayed page, such as page feed and page back, are arranged.

In the state where the tablet terminal 2 displays the operation screen 441 on the touch panel 201, the user can carry out an operation of designating a page to be displayed of the terminal management data 324 by a touch operation on the touch panel 201. For example, if the user touches an arbitrary thumbnail image in the thumbnail display section 443, the tablet terminal 2 generates a display instruction command designating the display of the page corresponding to the touched thumbnail image. If the user touches an arbitrary button in the page shift instruction section 446, the tablet terminal 2 generates a display instruction command designating a page shift corresponding to the touched button.

Back to FIG. 4, in step S42, the tablet terminal 2 transmits the display instruction command to the projector 100. The projector 100 receives the display instruction command from the tablet terminal 2 and transmits the received display instruction command to the tablet terminal 3, based on the communication setting data 62 (step S43).

The tablet terminal 3 receives the display instruction command from the projector 100 and updates the display on the touch panel 301, based on the page designated by the received display instruction command, of the currently displayed terminal management data 324 (step S44).

The operations of step S41 to S44 are not limited to the case of designating a display on a page basis. For example, the tablet terminal 2 may designate an area on one page or an area across a plurality of pages of the terminal management data 324, and the tablet terminal 3 may display an image or characters based on the designated area, on the touch panel 301. The operations of steps S41 to S44 may also be applied to display the terminal management data 324 that is not configured on a page basis.

As a third example, the case of causing the tablet terminal 3 to show a display based on data that is not stored in the storage unit 320 of the tablet terminal 3 is described.

This operation is executed when the user operating the tablet terminal 2 instructs the tablet terminal 3 to display data that is not stored in the storage unit 320. In response to an operation by the user (step S51), the tablet terminal transmits a display instruction command including an instruction for the tablet terminal 3 to display data, and the data to be displayed (step S52). In step S52, the tablet terminal 2 transmits the display instruction command and the data to the projector 100.

The projector 100 receives the display instruction command and the data from the tablet terminal 2 and transmits the received display instruction command to the tablet terminal 3, based on the communication setting data 62 (step S53). The projector 100 also transmits the data received from the tablet terminal 2 to the tablet terminal 3 (step S54).

The tablet terminal 3 receives the display instruction command and the data from the projector 100 and displays an image or characters based on the received data, on the touch panel 301 (step S55).

The display instruction command transmitted from the tablet terminal 2 may include information (file name, content title or the like) specifying the data to be displayed by the tablet terminal 3. In this case, if the data designated by the information included in the display instruction command is stored in the storage unit 320 of the tablet terminal 3, the transmission of the data from the projector 100 to the tablet terminal 3 may be omitted. For example, if the data designated by the information included in the display instruction command transmitted from the projector 100 is stored in the tablet terminal 3, the tablet terminal 3 may transmit control data to that effect to the projector 100 in this case, based on the control data transmitted from the tablet terminal 3, the projector 100 specifies the tablet terminal 3 in which the corresponding data is stored. The projector 100, in step S54, transmits data to the tablet terminal 3 in which the corresponding data is not stored. The projector 100 transmits only the display instruction command to the tablet terminal 3 having the corresponding data stored in the storage unit 320. In this example, the traffic between the projector 100 and the tablet terminal 3 can be restrained.

In steps S35, S44, and S55, the tablet terminal 3 may transmit data representing the display state to the projector 100, after displaying an image or characters on the touch panel 301 or updating the display. In this case, the projector 100 may cause the projection unit 20 to project an image or characters on the screen SC, based on the data received from the tablet terminal 3. For example, the projector 100 can project on the screen SC a copy of the screen displayed on the touch panel 301 by the tablet terminal 3.

For example, the tablet terminal 2 may transmit to the projector 100 a display instruction command including an instruction that one of the tablet terminals 3 as a target should transmit data representing the display state to the projector 100. In this case, the target tablet terminal 3, of the tablet terminals 3 receiving the display instruction command, transmits data representing the display state to the projector 100.

In this case, an operation on the tablet terminal 2 can show the screen displayed by one of the tablet terminals 3 to a plurality of users via the screen SC.

As described above, the display system 1 according to the embodiment of the invention includes the projector 100, the tablet terminal 2, and the tablet terminal 3. The tablet terminal 3 has the touch panel 301, which displays an image, and the control unit 310, which executes the application program 322. The tablet terminal 3 communicates with external devices including the projector 100. The tablet terminal 2 communicates with the tablet terminal 3 and the projector 100. The tablet terminal 2 transmits a command to the tablet terminal 3. On receiving the command from the tablet terminal 2, the tablet terminal 3 causes the control unit 310 to start executing the application program 322. In the tablet terminal 3, the control unit 310 connects to the projector 100 by the function of the application program 322 and starts communicating with the projector 100. The tablet terminal 2 transmits to the projector 100 a display instruction command instructing the tablet terminal 3 to display information. The projector 100 receives the display instruction command from the tablet terminal 2 and transmits the display instruction command to the tablet terminal 3 currently connected to the projector 100. If the tablet terminal 3 receives the display instruction command from the projector 100 while executing the application program 322, the tablet terminal 3 displays the information designated by the display instruction command on the touch panel 301.

In the display system 1, to which the communication system and the method for controlling the communication system according to the invention are applied, the tablet terminal 2 can cause the tablet terminal 3 to start executing the application program 322. The tablet terminal 2 can also cause the tablet terminal 3 to connect to the projector 100, based on the function of the application program 322. Therefore, with the use of the tablet terminal 2, the tablet terminal 3 can easily be enabled to communicate with the projector 100. Also, transmitting the display instruction command from the tablet terminal 2 to the projector 100 enables the tablet terminal 3 to display information. After the tablet terminal 3 is connected to the projector 100, transmitting information from the tablet terminal 2 to the projector 100 enables the tablet terminal 3 to operate. This can be realized even if the processing capability of the tablet terminal 2 is low. Thus, a system can be realized in which an operation of the tablet terminal 2 by the user can cause the application program 322 installed in the tablet terminal 3 to operate.

The tablet terminal 3, to which the terminal device according to the invention is applied, has the communication I/F unit 303 capable of communicating with the projector 100 and an external terminal device, the touch panel 301, and the control unit 310, which executes the application program 322. The tablet terminal 3 can execute the normal operation state, where the control unit 310 can execute the application program 322, and the standby state, where the execution of the application program 322 and the display on the touch panel 301 are stopped. If a command is received via the communication I/F unit 303 in the standby state, the control unit 310 shifts to the normal operation state and starts executing the application program 322. The control unit 310 connects to the projector 100 and starts communicating with the projector 100, based on the function of the application program 322. If a display instruction command is transmitted from the projector 100 during the execution of the application program 322, the control unit 310 displays the information designated by the display instruction command on the touch panel 301.

The tablet terminal 3 can execute the normal operation state, where the control unit 310 can execute the application program 322, and the standby state, where the execution of the application program 322 and the display on the touch panel 301 are stopped. If the tablet terminal 3 receives a command from the tablet terminal 2 in the standby state, the tablet terminal 3 shifts to the normal operation state and executes the application program 322.

With this configuration, the tablet terminal 2 can cause the tablet terminal 3 to start executing the application program 322 from the standby state. Thus, the operation to return the tablet terminal 3 from the standby state to the normal operation state can be omitted. Even if the tablet terminal 3 is scheduled to be used, there is no need to return the tablet terminal 3 to the normal operation state from the standby state in advance. Therefore, the tablet terminal 3 can wait in the standby state, thus saving power.

If the tablet terminal 3 is connected to the projector 100 by the function of the application program 322, the projector 100 generates or updates the communication setting data 62 representing the tablet terminal 3 currently connected to the projector 100. If the projector 100 receives a display instruction command from the tablet terminal 2, the projector 100 transmits the display instruction command to the tablet terminal 3, based on the communication setting data 62.

With this configuration, the projector 100 can cause the tablet terminal 3 to display information, by transmitting the display instruction command to the tablet, terminal 3, based on the communication setting data 62. Thus, the projector 100 can efficiently manage the connection state with the tablet terminal 3.

The tablet terminal 3 has the touch panel 301 as an operation unit. After starting executing the application program 322, the tablet terminal 3 shifts to the operation limitation mode, in which the acceptance of an operation on the touch panel 301 is limited, based on the function of the application program 322. Thus, an operation on the tablet terminal 3 can be prevented from disturbing the state of control by the tablet terminal 2 and the projector 100.

The tablet terminal 2 can transmit data to be displayed by the tablet terminal 3 and a display instruction command, to the projector 100. In this case, the tablet terminal 3 shows a display on the touch panel 301, based on the display instruction command and the data received from the projector 100. Therefore, the tablet, terminal 3 can execute display based on the data transmitted from the tablet terminal 2 to the projector 100. Thus, the load on the tablet terminal 2 can be reduced when the information to be displayed by the tablet terminal 3 needs to be distributed from the tablet terminal 2.

The tablet terminal 2 may transmit a display instruction command designating information to be displayed by the tablet terminal 3, to the projector 100. In this case, the tablet terminal 3 acquires the information designated by the display instruction command received from the projector 100, for example, from the storage unit 320, and shows a display on the touch panel 301 based on the acquired information. Thus, the load on the tablet terminal 2 when causing the tablet terminal 3 to display information can be reduced further.

The tablet terminal 3 may download the data designated by the display instruction command from a device other than the tablet terminal 2 and the projector 100, for example, from an external server device. In this case, the display instruction command may include a URL (uniform resource locator) for the tablet terminal 3 to download the data from the server device.

After the control unit 310 starts executing the application program 322, the tablet terminal 3 may transmit information representing the content of display on the touch panel 301 to the projector 100, based on the function of the application program 322. In this case, the projector 100 can process the content displayed by the tablet terminal 3.

The foregoing embodiment is simply an example of specific form of the invention and should not limit the invention. The invention can also be applied in difference forms.

For example, while the foregoing embodiment describes a configuration where one projector 100 establishes communication with a plurality of tablet terminals 3, configuration where a plurality of tablet terminals 3 connect to and communicate with each of a plurality of projectors 100 may be employed. In this case, the tablet terminal 2 may transmit a display instruction command to the plurality of projectors 100, and the display instruction command may be transmitted to the tablet terminal 3 which communicates to one of the plurality of projectors 100.

The display device according to the invention is not limited to the projector 100 projecting an image on the screen SC as described above. For example, the invention can also be applied to a liquid crystal monitor or liquid crystal television which displays an image on a liquid crystal display panel, or a monitor device or television receiver which displays an image on a PDP (plasma display panel). The invention can also be applied to a self-emission display device such as a monitor device or television receiver which displays an image on an organic EL display panel called OLED (organic LED) or OEL (organic electro-luminescence). The invention can also be applied to various other display devices.

The functional blocks shown in FIGS. 2 and 3 represent the functional configurations of the tablet terminals 2, 3 and the projector 100 and should not limit the specific forms of installation of these elements. That is, hardware corresponding to the illustrated functional blocks need not be installed. As a matter of course, one processor can implement the functions of a plurality of functional units by executing a program. Also, a part of the functions implemented by software in the embodiment may be implemented by hardware, and a part of the functions implemented by hardware may be implemented by software.

The terminal device according to the invention is not limited to the tablet terminals 2, 3. For example, any device that can display an image, such as a desktop computer, a mobile phone including a smartphone, or a video/music player, may be employed. Also, for example, a server device connected to the tablet terminals 2, 3 and the projector 100 via a communication line may be provided. In this case, for example, the tablet terminal 3 may be configured to acquire the terminal management data 324 or the like from the server device. Moreover, specific details of the other parts of the devices forming the display system 1 can be changed arbitrarily without departing from the spirit of the invention.

The invention may also be configured in the form of a program executed by a computer to implement a method for controlling the tablet terminals 2, 3, a recording medium on which this program is recorded in a computer-readable manner, or a transmission medium which transmits this program. The invention may also be configured in the form of a data signal or the like which embodies this program within a carrier wave.

As the recording medium, a magnetic or optical recording medium, or a semiconductor memory device can be used. Specifically, a portable recording medium such as a flexible disk, HDD, CD-ROM, DVD, Blu-ray (trademark registered) disc, magneto-optical disk, flash memory, or card-type recording medium, or a fixed recording medium can be used. The recording medium may also be a non-volatile storage device such as a RAM, ROM, or HDD, which is an internal storage device provided in each device in the display system 1 or provided in an external device connected to each device.

What is claimed is:

1. A communication system comprising:
a display device;
a first terminal which has a display unit for displaying an image and a control unit for executing an application installed on the first terminal, and which communicates with an external device including the display device; and
a second terminal which communicates with the first terminal and the display device, wherein:
when the first terminal is not connected to the display device and the control unit of the first terminal is not executing the application installed on the first terminal:
the second terminal transmits control information to the first terminal,
in response to receiving the control information from the second terminal, the control unit of the first terminal automatically starts, without a user input, (i) executing the application installed on the first terminal and (ii) communicating with the display device by a function of the application,
the second terminal transmits display instruction information to the display device,
the display device receives the display instruction information from the second terminal and transmits the display instruction information to the first terminal currently connected to the display device, and
the first terminal causes the display unit to display information designated by the display instruction information, when the first terminal receives the display instruction information from the display device while executing the application.

2. The communication system according to claim 1, wherein:
the first terminal can execute a normal operation state where the control unit can execute the application and a power-saving state where the execution of the application and the display by the display unit are stopped, and
the first terminal shifts to the normal operation state and executes the application, in response to receiving the control information from the second terminal when in the power-saving state.

3. The communication system according to claim 1, wherein
when the first terminal is connected to the display device by a function of the application, the display device generates connection information indicating the first terminal currently connected to the display device, and
the display device transmits the display instruction information to the first terminal, based on the connection information, when the display device receives the display instruction information from the second terminal.

4. The communication system according to claim 1, wherein
the first terminal has an operation unit, and
the first terminal, after starting executing the application, shifts to an operation limiting mode where acceptance of an operation by the operation unit is limited, based on a function of the application.

5. The communication system according to claim 1, wherein
the second terminal transmits information to be displayed by the first terminal and the display instruction information to the display device, and
the first terminal causes the display unit to show a display based on the information, according to the display instruction information received from the display device.

6. The communication system according to claim 1, wherein
the second terminal transmits the display instruction information designating information to be displayed by the first terminal, to the display device, and
the first terminal acquires the information designated by the display instruction information received from the display device and causes the display unit to show a display based on the acquired information.

7. The communication system according to claim 1, wherein
the first terminal, after causing the control unit to start executing the application, transmits information representing content of display on the display unit to the display device, based on a function of the application.

8. A terminal device comprising:
a communication unit capable of communicating with a display device and an external terminal device;
a display unit for displaying an image; and
a control unit for executing an application installed on the terminal device, wherein:
the terminal device can execute a normal operation state where the control unit can execute the application and a power-saving state where the execution of the application and a display by the display unit are stopped,
when the terminal device is in the power-saving state and is not connected to the display device, and the control unit of the terminal device is not executing the application installed on the terminal device:
in response to the communication unit of the terminal device receiving control information transmitted from the external terminal device, the control unit of the terminal device automatically shifts to the normal operation state, without a user input, such that:
the control unit automatically starts, without a user input, executing the application, and
the terminal device automatically connects, without a user input, to the display device and starts communicating, based on a function of the application, and
when display instruction information is transmitted from the display device during the execution of the application, the terminal device causes the display unit to display information designated by the display instruction information.

9. A method for controlling a communication system, the communication system comprising:
a display device;
a first terminal which has a display unit for displaying an image and a control unit for executing an application installed on the first terminal, and which communicates with an external device including the display device; and
a second terminal which communicates with the first terminal and the display device,
the method comprising:
when the first terminal is not connected to the display device and the control unit of the first terminal is not executing the application installed on the first terminal:
transmitting control information to the first terminal, by the second terminal;
in response to the first terminal receiving the control information from the second terminal, automatically starting, without a user input, (i) executing the application installed on the first terminal and (ii) communicating with the display device by a function of the application;
transmitting display instruction to the display device by the second terminal;
receiving the display instruction information from the second terminal by the display device;
transmitting the display instruction information to the first terminal currently connected to the display device by the display device; and
receiving the display instruction information transmitted from the display device by the first terminal, while the first terminal is executing the application, and displaying, via the display unit, information designated by the display instruction information received from the display device.

* * * * *